F. G. GAUNTT.
DRIVING MECHANISM FOR VEHICLES.
APPLICATION FILED DEC. 31, 1909.
1,003,135. Patented Sept. 12, 1911.
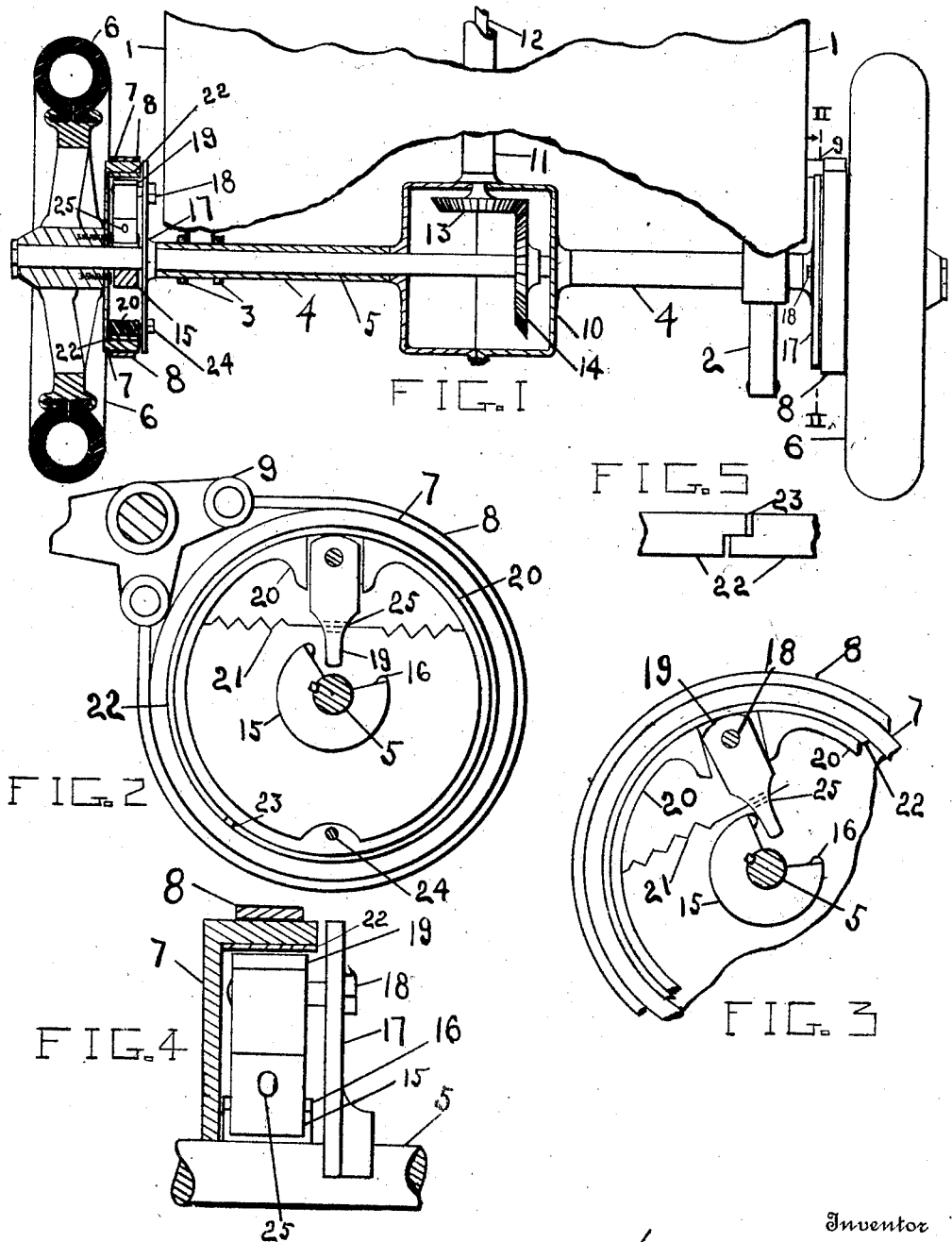

UNITED STATES PATENT OFFICE.

FOREST G. GAUNTT, OF FORT WAYNE, INDIANA.

DRIVING MECHANISM FOR VEHICLES.

1,003,135.

Specification of Letters Patent. Patented Sept. 12, 1911.

Application filed December 31, 1909. Serial No. 535,827.

*To all whom it may concern:*

Be it known that I, FOREST G. GAUNTT, a citizen of the United States, residing at Fort Wayne, Allen county, Indiana, have invented new and useful Driving Mechanisms for Vehicles, of which the following is a specification.

This invention relates to a connecting mechanism, more particularly of the compensating type operable in two directions.

This invention has utility when adapted to a driving mechanism which may be operated independently thereof, or in either of two directions, as in connection with motor vehicles serving for compensating gearing.

Referring to the drawings: Figure 1 is a fragmentary plan view of an embodiment of the device in vehicle driving mechanism; Fig. 2 is a detail view of the connecting mechanism on the line II—II, Fig. 1; Fig. 3 is a similar view, with parts broken away, the device being in position for backing the vehicle, instead of disconnected as in Fig. 2; Fig. 4 is a fragmentary view, partially in section, showing the locking element; and Fig. 5 is a detail view showing the overlapping end feature of the expansible wear or friction ring.

The vehicle body 1 is mounted upon the springs 2, which by the U-shaped clamping devices 3 are mounted on the casing 4 for the rear driving axle or shaft member 5. Loosely mounted on each end of the driving member 5 is a driven member or traction wheel 6. Each wheel 6 carries firmly bolted to its inner face the flanged disk member 7, the outer face of which flange 7 coacts with the brake band 8 operated by the lever 9.

Centrally of the shaft 5 is the housing 10 having leading therefrom the tubular casing 11, in which the driving shaft 12, from the prime mover on the vehicle, extends to the housing 10. The shaft 12 is provided with the beveled gear 13 meshing with the gear 14 fixed on shaft 5.

Keyed near each end of the shaft 5 is the trip or engaging means 15, shown as of segmental form and provided with spaced contact cheeks 16. Loosely mounted on shaft 5 adjacent the fixed trip 15 is the carrier 17, having pin 18 to pivotally mount the element 19 between the trip 15 and the flange 7. The expansion ring 20 is mounted within the flange 7 and has the cheeks of its open ends normally drawn toward the element 19 by the spring 21. Between the expansion ring 20 and the flange 7 is disposed the split wear or friction ring 22, which may be of a dissimilar metal, as brass, to eliminate the sudden concussion when the driver is thrown in, by gradually coming into holding engagement, as well as to increase the effectiveness of the transmission lock. When element 19 is rocked to expand ring 20, it frictionally engages the inner face of friction ring 22, and then forces this ring 22 against the inner face of flange 7 to gently bring flange 7 up to speed. The ring 22 has its ends overlap at stepped portions 23 (Fig. 5) to provide continuous wear surface in taking care of expansion. The expansion ring 20, when contracted by spring 21, is held away from the ring 22 by pin 24 mounted in the carrier 17 to aid in freeing from driving connection. Opening 25 through element 19 is for spring 21.

With the driven or traction wheel traveling at a rate similar to or greater than the drive shaft, as in free running or coasting, or the outer wheel in turning, the connecting mechanism is free as shown in Fig. 2. The opening in segment 15 is of such width that in starting, say to back, a cheek 16 will knock element 19 to so rock this element as to force the cheeks of the expansion ring 20 apart and connect up for driving. This opening in element 15 permits considerable play for element 19. This feature precludes racing as well as prevents the mechanism from being sensitive to each little fluctuation, while the play range also allows of sufficient free swing between parts 15 and 19 for concussion therebetween to throw into locked relation as well as to force out of such relation. This spacing of the pivoted element from the cheeks precludes racing as there is sufficient leeway between the parts that in freeing from one side the other is not locked to thereby cause constant vibration between driving in one direction and driving in the other direction. Such tossing back and forth is racing which the extended idle position in this structure avoids. This view of Fig. 3 is the position for forward driving of the mechanism at the left in Fig. 1, or for backward driving of the mechanism to the right in Fig. 1. As soon as the relative speed of the shaft 5 and the driven member 7 is such that the former does not keep up, the spring 21, by drawing the cheeks of ring 20 inward, not only frees the expansion ring 20 from driving relation with ring 22, but brings element 19 into radial position ready for tripping in either direction by the fixed engaging means 15 and thereby again rocked into driving relation.

The mechanism comprises few parts, of simple and substantial form, effective for quick and reliable operation for connecting in either direction, disconnecting, as well as for compensating between differently driven parts, as drive wheels in turning corners.

What is claimed and it is desired to secure by Letters Patent is:

The combination with rotatable driving and driven members, of a connecting mechanism embodying a relatively loosely mounted carrier provided with a pivoted wedge element, an expansion device with which said pivoted element may coact, yieldable means connected to the expansion device to center the wedge element, and an engaging element fixed with one of the members and provided with contacting cheeks spaced in excess of pivoted element locking movement from the pivoted element to permit free range of movement of as great extent as the locking movement relatively to the pivoted element to preclude racing and also allow of concussion between the elements.

In testimony whereof I affix my signature in the presence of two witnesses.

FOREST G. GAUNTT.

Witnesses:
FRANKLIN P. WIET.
WALTER D. MILLER